United States Patent [19]

Takemoto

[11] Patent Number: 5,276,511
[45] Date of Patent: Jan. 4, 1994

[54] METHOD OF AND APPARATUS FOR PROCESSING IMAGE BY SETTING UP IMAGE PROCESSING CONDITIONS ON THE BASIS OF FINISHING INFORMATION

[75] Inventor: Fumito Takemoto, Kanagawa, Japan

[73] Assignee: Fuji Photo Film Co., Ltd., Kanagawa, Japan

[21] Appl. No.: 836,837

[22] Filed: Feb. 19, 1992

[30] Foreign Application Priority Data

Feb. 21, 1991 [JP] Japan .................. 3-027586

[51] Int. Cl.$^5$ ............................................. H04N 1/46
[52] U.S. Cl. .................................... 358/527; 358/500; 358/448
[58] Field of Search ................. 358/448, 453, 464, 76, 358/80, 75

[56] References Cited

U.S. PATENT DOCUMENTS

| | | | |
|---|---|---|---|
| 4,476,487 | 10/1984 | Klie et al. | 358/80 |
| 4,591,904 | 5/1986 | Urabe et al. | 358/75 |
| 4,689,669 | 8/1987 | Hoshino et al. | 358/76 |
| 4,792,847 | 12/1988 | Shimazaki et al. | 358/76 |
| 4,935,809 | 6/1990 | Hayashi et al. | 358/76 |
| 5,119,182 | 6/1992 | Tsuboi et al. | 358/75 |
| 5,121,198 | 6/1992 | Maronian | 358/80 |
| 5,155,588 | 10/1992 | Levien | 358/80 |

FOREIGN PATENT DOCUMENTS

| | | |
|---|---|---|
| 0322879 | 7/1989 | European Pat. Off. |
| 0354490 | 2/1990 | European Pat. Off. |
| 0363988 | 4/1990 | European Pat. Off. |
| 2-50859 | 2/1990 | Japan |
| 2117902 | 10/1983 | United Kingdom |

OTHER PUBLICATIONS

Patent Abstracts of Japan, Publication No. JP62115575, May 27, 1987.
Patent Abstracts of Japan, Publication No. JP2236786, Sep. 19, 1990.
Facial Pattern Detection and Color Correction from Negative Color Film, Satoh, et al., Journal of Imaging Technology, vol. 16, No. 2, Apr. 1990.

Primary Examiner—Edward L. Coles, Sr.
Assistant Examiner—Fan Lee
Attorney, Agent, or Firm—Sughrue, Mion, Zinn, Macpeak & Seas

[57] ABSTRACT

Disclosed herein is a method of and an apparatus for electrically processing images. Image processing conditions are set up based on image data obtained by scanning image information recorded on an original to be read. Then, a desired image is displayed on a display unit based on the image data, and finishing information is set to the image displayed thereon. Thereafter, hue space data corresponding to the finishing information set to the image are determined to extract desired image data from a region set up by the hue space data. In addition, a hue image region relative to at least one main subject is selected from hue image regions preset by the image data thus extracted, and image processing conditions are set so as to regard image data in the selected hue image region as the optimum value for the hue in the hue space data. The hue space data are set in a hue space distributed in such a manner as to be directed from an image low-density region to an image high-density region.

7 Claims, 12 Drawing Sheets

+ PARTICULAR SPOTS SPECIFIED BY MOUSE

+ PARTICULAR SPOTS SPECIFIED BY MOUSE

METHOD OF AND APPARATUS FOR PROCESSING IMAGE BY SETTING UP IMAGE PROCESSING CONDITIONS ON THE BASIS OF FINISHING INFORMATION

BACKGROUND OF THE INVENTION

1. Field of the Invention:

The present invention relates to a method of and an apparatus for electrically processing each of images wherein an operator can automatically set up image processing conditions based on desired finishing information to form a reproduced image having the optimum hue.

2. Description of the Related Art:

An image scanning reading and reproducing system is widely used in the printing and platemaking fields, for example, for electrically processing image information stored in originals or subjects to be read so as to produce original film plates with a view toward simplifying working processes and improving the quality of printed images.

In order to produce original film plates according to the purpose in an image processing apparatus of the image scanning reading and reproducing system, a so-called pre-scan operation for firstly feeding an original cassette to a reading unit and then setting up conditions (hereinafter called "image processing conditions") such as magnification, image processing, etc. is carried out. Then, a so-called main-scan operation for setting up the optimum image processing conditions based on image information obtained by the pre-scan operation and reading image information again in accordance with the image processing conditions is performed.

An image processing condition setting method for adjusting the hues in an image, which is employed in the image processing apparatus, has been disclosed in Japanese Patent Application Laid-Open No. 2-50859. According to the disclosure, regions for storage or memory colors (colors which still remain in his or her memory from his or her visual experience) are set in a RGB three-dimensional hue space. Then, image processing conditions are set up to determine pixels of the memory colors as the standard hue when the rate at which pixels of an image obtained by the pre-scan operation are included in the regions referred to above reaches the given threshold value or greater.

The above disclosure has, however, a problem that when objects such as a wooden wall, a sand beach, etc. having colors similar to a skin color exist in an image or picture, they are also recognized as objects to be processed, so that appropriate image processing conditions cannot be set up.

Therefore, the present applicant has proposed a means in which particular spots or places at which image processing conditions are set up are designated or specified and the image processing conditions are set only to the particular spots, thereby making it possible to avoid such a problem (see Japanese Patent Application No. 2-229706).

SUMMARY OF THE INVENTION

With the foregoing in view, it is a principal object of the present invention to provide a method of and an apparatus for processing an image wherein a desired image to be processed can reliably be produced and a process for producing the desired image can be automated.

It is another object of the present invention to provide a method of processing images by setting up image processing conditions based on image data obtained by scanning image information recorded on an original to be read, the method comprising the steps: a first step of displaying one of the images based on the image data, a second step of setting finishing information to the one image displayed in the first step, a third step of hue space data being determined in accordance with the finishing information set to the one image in the second step, thereby extracting desired image data from a region set up by the hue space data, and a fourth step of a hue image region relative to main subjects being determined from given hue image regions set by the image data extracted in the third step and setting up image processing conditions to determine image data in the determined hue image region as the optimum hue value in the hue space data.

It is a further object of the present invention to provide a method wherein the main subjects in the fourth step are arranged in such a manner that the centrally-positioned subject of the main subjects has weight greater than that of each of the peripheral subjects as viewed in the one image displayed in the first step.

It is a still further object of the present invention to provide a method of processing images by setting up image processing conditions based on image data obtained by scanning image information recorded on an original to be read, the method comprising the steps: a first step of displaying one of the images based on the image data, a second step of setting finishing information to the one image displayed in the first step and specifying, as particular spots, objective portions to be set up on the basis of the finishing information, a third step of hue space data being determined in accordance with the finishing information set to the one image in the second step and determining whether or not image data at the particular spots fall within a region set by the hue space data, and a fourth step of determining whether or not image processing conditions relative to the particular spots are set up based on the result of the determination in the third step and setting up image processing conditions to determine the image data at the particular spots as the optimum value if the answer is determined to be positive and specifying particular spots again if the answer is determined to be negative.

It is a still further object of the present invention to provide an apparatus for processing images by setting up image processing conditions based on image data obtained by scanning image information recorded on an original to be read, the apparatus comprising, image displaying means for displaying one of the images thereon based on the image data, finishing information setting means for setting finishing information to the one image, specifying means for specifying, as particular spots, objective portions to be set up on the basis of the finishing information, storing means for storing therein hue space data corresponding to the finishing information, determining/displaying means for determining whether or not image data at the particular spots fall within a region set by the hue space data and displaying the result of the determination thereon, and image processing condition setting means for setting up image processing conditions based on the optimum hue value in the hue space data, whereby it is determined whether or not image processing conditions relative to the particular spots are set up based on the result of the determination, and if the answer is determined to be positive, image processing conditions are set up to determine the image data at the particular spots as the optimum hue value, whereas if the answer is determined to be negative, desired particular spots are specified again.

It is a still further object of the present invention to provide an apparatus for processing images by setting up image processing conditions based on image data obtained by scanning image information recorded on an original to be read, the apparatus comprising finishing information setting means for setting finishing information to one of the images, storing means for storing therein hue space data corresponding to the finishing information, image data extracting means for extracting desired image data from a region set up by the hue space data, and image processing condition setting means activated such that a hue image region relative to at least one main subject is determined from predetermined hue image regions set by the image data extracted by the image data extracting means and for setting up image processing conditions to determine image data in the determined hue image region as the optimum hue value in the hue space data.

It is a still further object of the present invention to provide an apparatus wherein the hue space data corresponding to the finishing information are symmetric about a given hue axis of a hue space, and are set in a hue space distributed in such a manner as to be directed from an image low-density region to an image high-density region.

It is a still further object of the present invention to provide an apparatus for processing images by setting up image processing conditions based on image data obtained by scanning image information recorded on an original to be read, the apparatus comprising image displaying means for displaying one of the images thereon based on the image data, finishing information setting means for setting finishing information to the one image, storing means for storing therein hue space data corresponding to the finishing information, specifying means for specifying, as particular spots, objective portions to be set up on the basis of the finishing information, selecting means for selectively determining whether or not the portions are specified as the particular spots, first image processing condition setting means for setting up image processing conditions to determine image data at the particular spots as the optimum hue value in the finishing information when the answer is determined to be positive in the selecting means and the particular spots are specified by the specifying means, and second image processing condition setting means for setting up image processing conditions to determine image data in a region set by the hue space data as the optimum hue value in the finishing information when the answer is determined to be negative in the selecting means.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
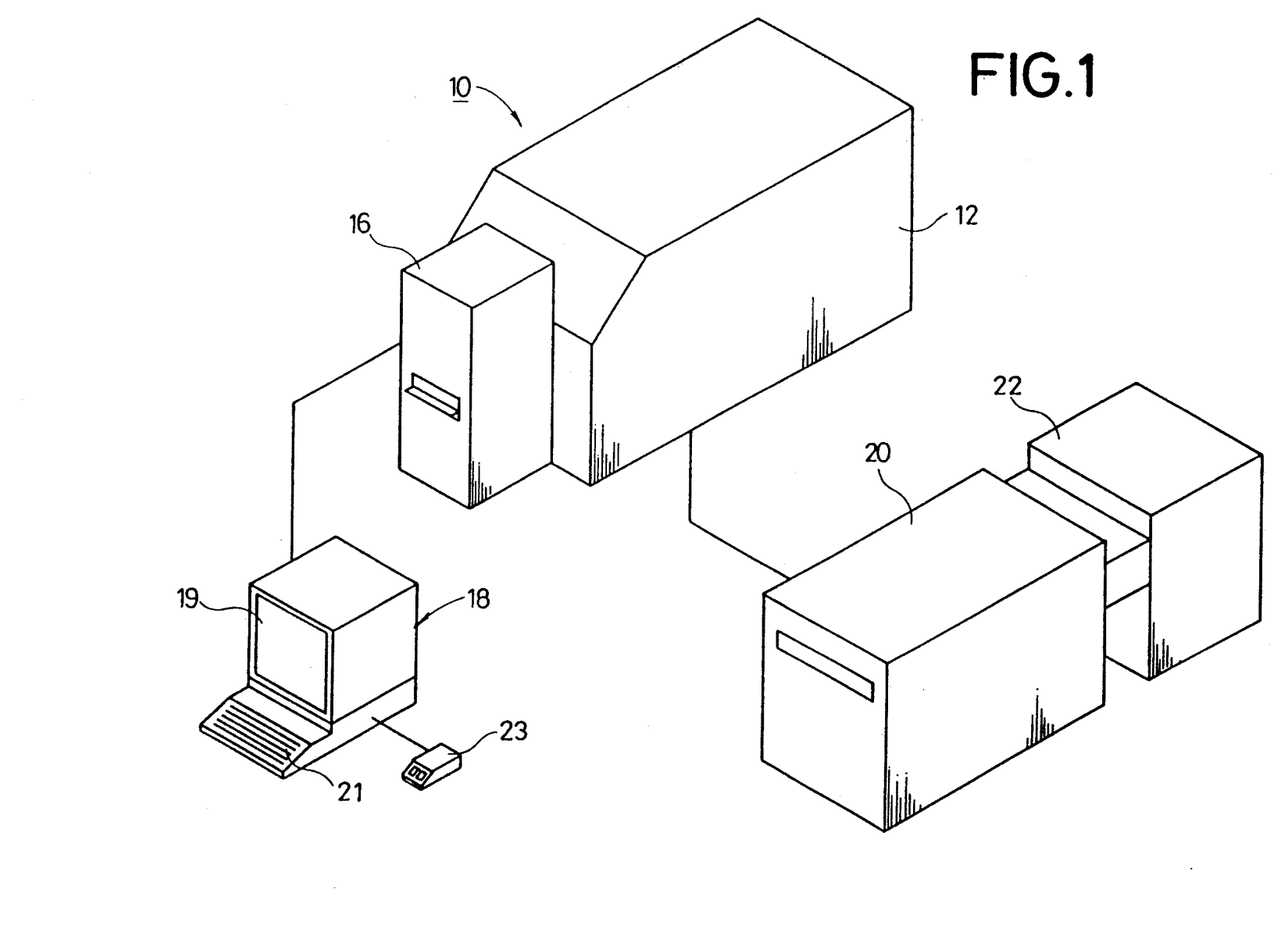
FIG. 1 is a diagram showing the structure of an image scanning reading and reproducing system to which an image processing apparatus according to the present invention is applied.

In FIG. 1, reference numeral 10 indicates an image scanning reading and reproducing system. The image scanning reading and reproducing system 10 basically comprises an image reading apparatus 12, an original cassette feeding apparatus 16 capable of automatically feeding an original cassette 14 (see FIG. 2) with originals S to be read held therein to the image reading apparatus 12, a console 18 for manipulating the image reading apparatus 12, an image output apparatus 20 for reproducing, as an output, image information read by the image reading apparatus 12 on a photographic film, and an automatic photographic processor 22 for developing the film to produce an original film plate. Incidentally, the console 18 includes a CRT display 19 for displaying image information or the like thereon, a keyboard 21 and a mouse 23.

Figure 2:
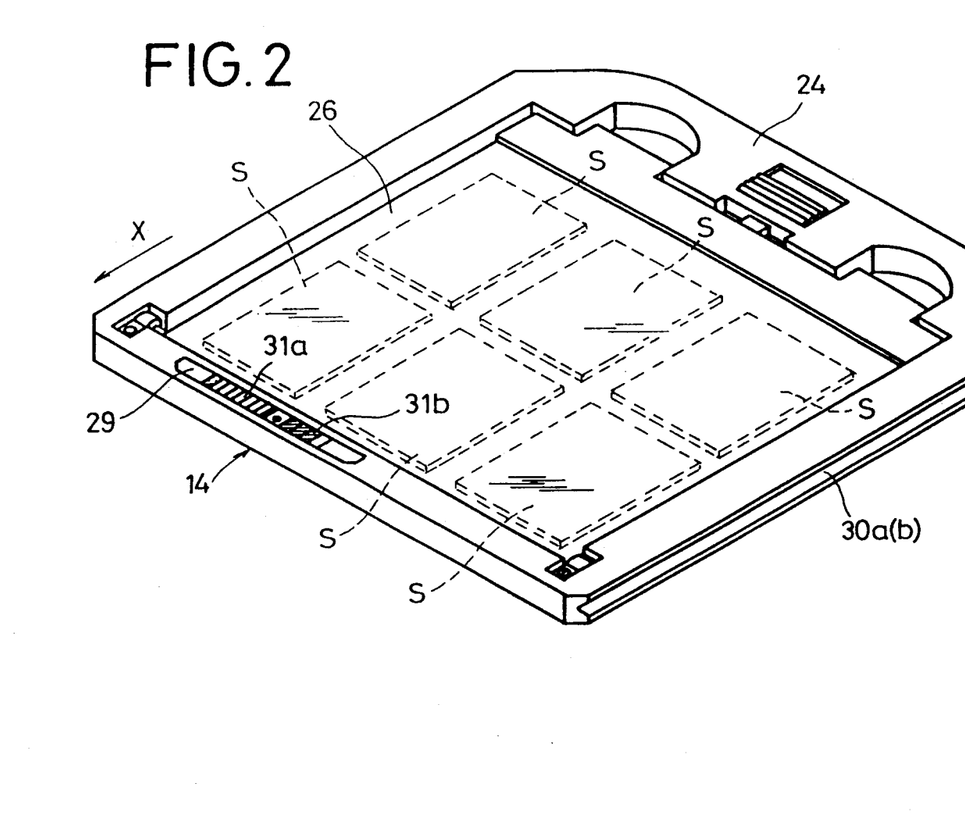
FIG. 2 is a perspective view illustrating an original cassette loaded in an image reading apparatus shown in FIG. 1.

The original cassette 14 shown in FIG. 2 is used to hold six light-transmissive originals S such as a 135-mm film between two support glass panels 26 enclosed by a frame 24 shaped substantially in the form of a square. In addition, the original cassette 14 has V-shaped grooves 30a, 30b which are defined in opposite sides thereof extending in an auxiliary scanning direction (i.e., in the direction indicated by the arrow X in FIG. 2) to feed the original cassette 14 toward the image reading apparatus 12 and which extend along the direction in which the original cassette 14 is fed. On the upper surface of the leading end of the frame 24, which extends in the direction in which the original cassette 14 is fed, there is also disposed a cassette identifying unit 29 for identifying the original cassette 14 and each original S held therein. In order to identify the original cassette 14 and the type of the original S stored in the original cassette 14, the cassette identifying unit 29 is made up by a combination of a plurality of light-transmissive portions 31a and light-intransmissive portions 31b.

Figure 3:
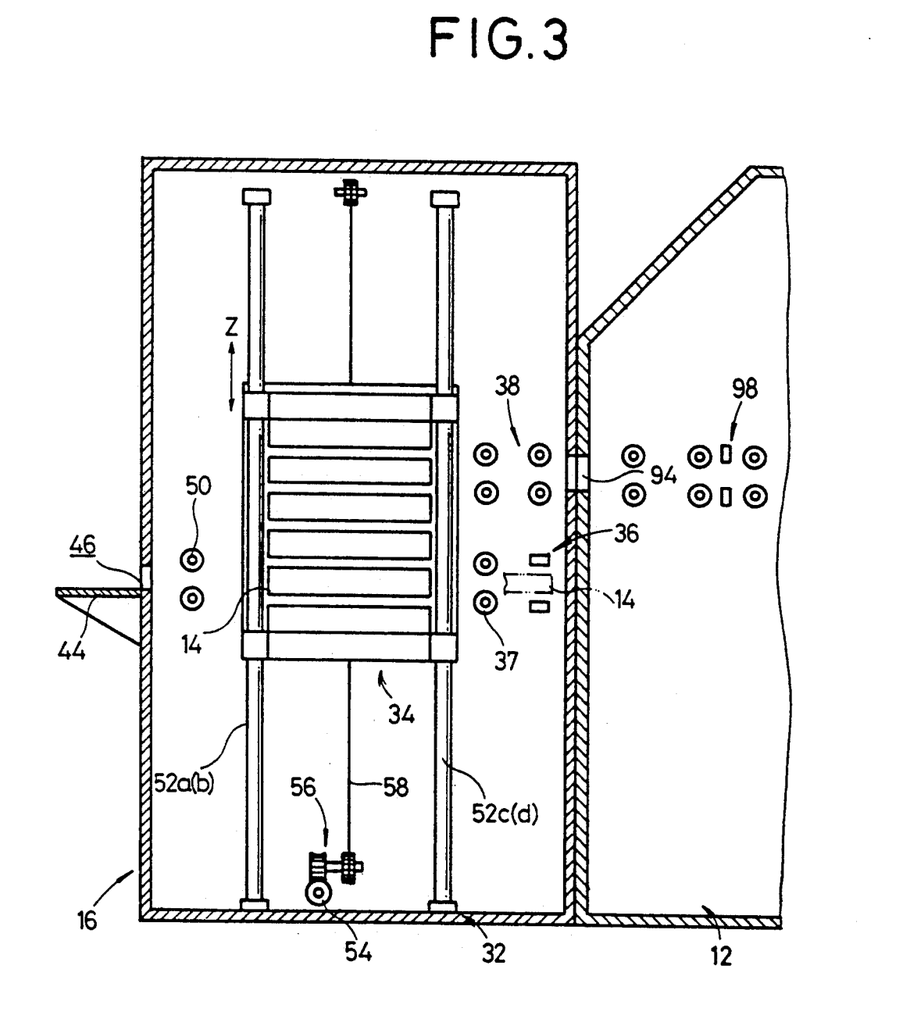
FIG. 3 is a cross-sectional view depicting an original cassette feeding apparatus shown in FIG. 1.

FIG. 3 shows the structure of the original cassette feeding apparatus 16. The original cassette feeding apparatus 16 is surrounded by a casing 32 and comprises a cassette holding means 34 for accommodating the original cassette 14 therein, a cassette identifying means 36 for identifying the original cassette 14, and a cassette feeding means 38 for feeding the original cassette 14 stored in the cassette holding means 34 to the image reading apparatus 12 to which the original cassette feeding apparatus 16 is connected.

The original cassette feeding apparatus 16 has a cassette insertion table 44 disposed in front of the original cassette feeding apparatus 16 and a cassette insertion hole 46 defined in the frontal part thereof. A pair of feed-in, i.e., insertion rollers 50 for inserting the original cassette 14 into the original cassette feeding apparatus 16 is disposed in an inner region corresponding to the cassette insertion hole 46.

The cassette identifying means 36 is made up by a combination of a plurality of light-emitting devices and light-detecting devices. In addition, the cassette identifying means 36 reads data set in the cassette identifying unit 29 of the original cassette 14 delivered by a pair of feed rollers 37 so as to identify the original cassette 14 and the type of the original S or the like.

The cassette holding means 34 comprises a cage which is supported by four guide bars 52a through 52d provided upright within the casing 32. In addition, the cassette holding means 34 can be moved in upward and downward directions (i.e., in the direction indicated by the arrow Z) by a worm gear 56 coupled to an electric motor 54 and a chain 58.

Figure 4:
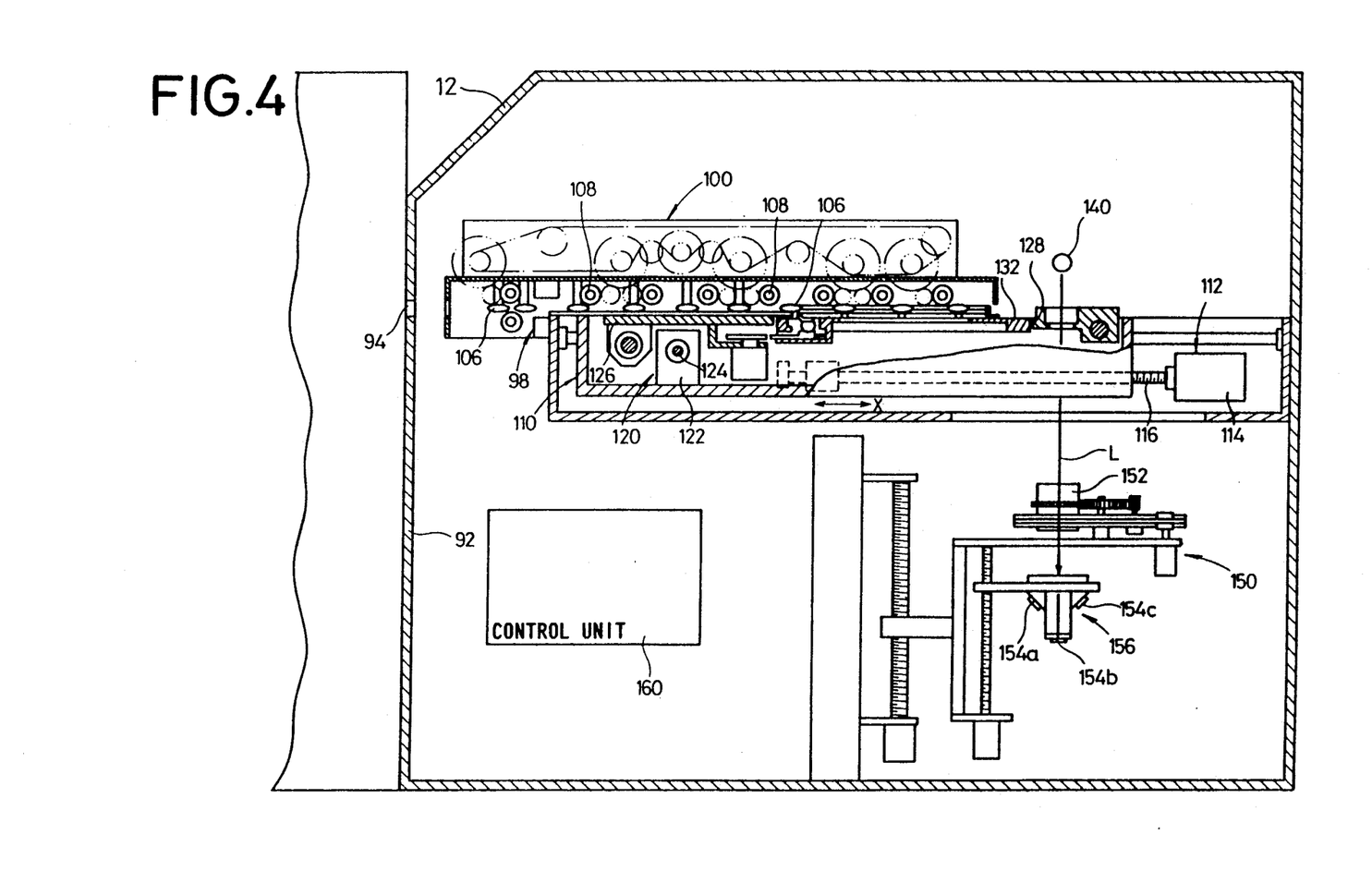
FIG. 4 is a cross-sectional view showing the image reading apparatus illustrated in FIG. 1.

Referring now to FIG. 4, the image reading apparatus 12 surrounded by a casing 92 has a cassette insertion hole 94 defined therein, which communicates with the original cassette feeding apparatus 16. In the image reading apparatus 12, there is disposed near the cassette insertion hole 94, an identifying mechanism 98 for identifying the original cassette 14 and the type of each of the originals S stored in the original cassette 14. Incidentally, the identifying mechanism 98 is constructed in a manner similar to the cassette identifying means 36 disposed in the original cassette feeding apparatus 16.

On the other hand, one end of a feed mechanism 100 is disposed near the identifying mechanism 98, whereas the other end thereof extends to a position above a turntable 132 to be described later. The feed mechanism 100 has a plurality of guide rollers 106, which are held in point-to-point contact with the V-shaped grooves 30a, 30b of the original cassette 14. In addition, the feed mechanism 100 also has a plurality of feed rollers 108 which are brought into contact with a feed surface of the frame 24 of the original cassette 14 and which feed the original cassette 14 in a desired direction. Below the feed mechanism 100, there is disposed an original table 110 which is movable in an auxiliary scanning direction (i.e., in the direction indicated by the arrow X) by an auxiliary scanning mechanism 112. The auxiliary scanning mechanism 112 includes a rotative drive source 114 to which there is coupled a ball screw 116 that moves the original table 110 in the direction indicated by the arrow X.

The original table 110 has a trimming mechanism 120 for moving the original cassette 14 back and forth in a trimming direction, i.e., in a direction normal to the auxiliary scanning direction (i.e., the direction indicated by the arrow X). The trimming mechanism 120 has a rotative drive source 122 mounted on the original table 110, which in turn rotates a ball screw 124 so as to move a trimming table 126 in the direction normal to the auxiliary scanning direction. The trimming table 126 has an aperture 128 which extends therethrough. A turntable 132 is mounted in the aperture 128 and supports thereon an unillustrated mechanism for rotating the original cassette 14 by a predetermined angle.

There is also disposed within the casing 92, a light source 140 which constitutes a transmissive illuminating mechanism. In addition, an image reading unit 150 serving as an image reading means for photoelectrically reading illuminating light L emitted from the light source 140 is disposed below the light source 140. The image reading unit 150 has a focusing lens 152 and a photoelectrically converting unit 156 comprising a plurality of CCDs 154a through 154c. In addition, the image reading unit 150 photoelectrically reads image information carried by each of the originals S as image information corresponding to the colors of R, G, and B.

Figure 5:
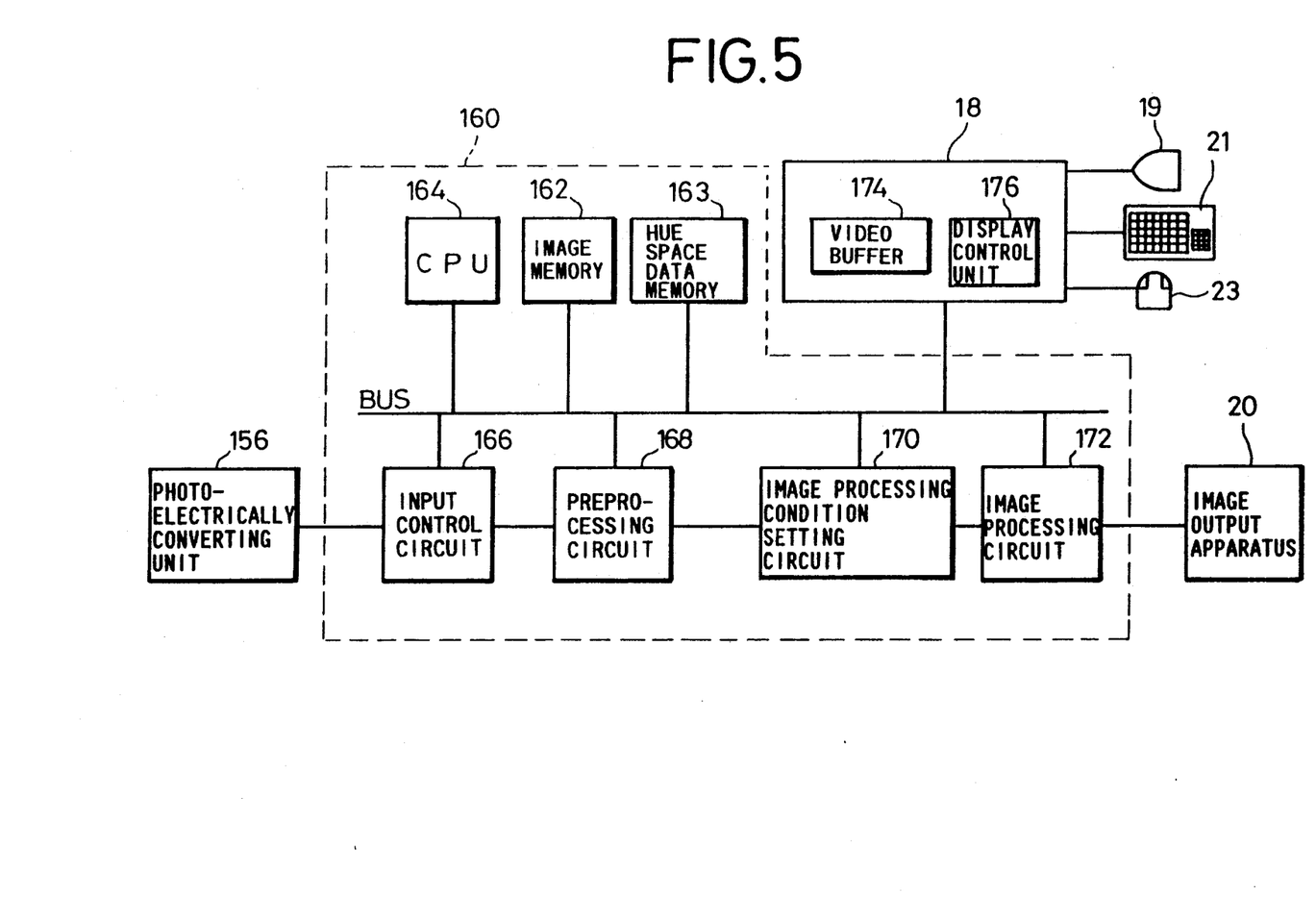
FIG. 5 is a block diagram showing the structure of a control unit shown in FIG. 1.

The image reading apparatus 12 constructed as described above is driven under control by a control unit 160. As shown in FIG. 5, the control unit 160 includes an image memory 162, a hue space data memory 163, a CPU 164, an input control circuit 166, a preprocessing circuit 168, an image processing condition setting circuit 170 and an image processing circuit 172. Incidentally, the control unit 160 and the console 18 constitutes an image processing apparatus according to the present embodiment, which serves as a determining/displaying means and/or an image data extracting means.

The CPU 164 performs general control of the image reading apparatus 12. The console 18 comprises a video buffer 174 and a display control unit 176. In addition, the console 18 generates an output to be sent to the CRT display 19 thereof, and accepts inputs from the keyboard 21 and the mouse 23 electrically connected to the console 18. Incidentally, the CRT display 19 serves as an image displaying means, whereas the keyboard 21 and the mouse 23 serves as an instructing or specifying means and a finishing information setting means respectively.

The input control circuit 166 determines the type of the original cassette 14 and the like, and controls the region of an image to be read by the photoelectrically converting unit 156. In addition, the input control circuit 166 controls an image reading operation of the photoelectrically converting unit 156. The preprocessing circuit 168 pre-processes image data obtained from the photoelectrically converting unit 156 and sends thus pre-processed image data to the console 18 and the image processing condition setting circuit 170. The image memory 162 stores the read image data therein. The image processing condition setting circuit 170 sets up image processing conditions at the time of the main-scan process on the basis of image data obtained by scanning the original S to be read. The image processing circuit 172 electrically processes the image data fed from the image processing condition setting circuit 170 in accordance with the image processing conditions so as to output the same to the image output apparatus 20.

A description will now be made of a processing sequence of producing an original film plate by using the image scanning reading and reproducing system 10 constructed as described above.

Figure 6:
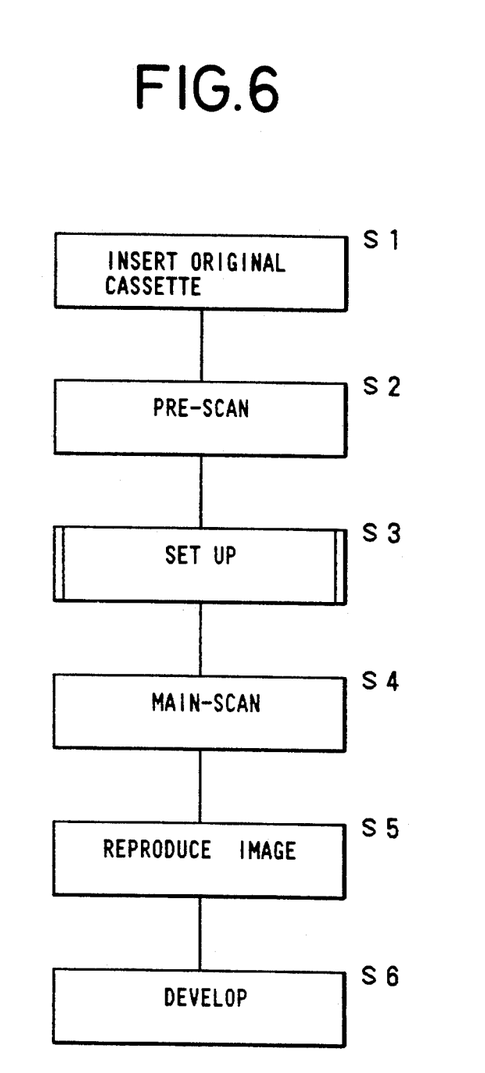
FIG. 6 is a schematic flowchart for describing a processing sequence of the image scanning reading and reproducing system shown in FIG. 1.

A description will first be made of a flowchart for describing an overall processing sequence for reading image information from an original S to be read and producing an original film plate with reference to FIG. 6.

The original cassette 14 with a desired original S stored therein is inserted from the cassette insertion hole 46 of the original cassette feeding apparatus 16 shown in FIG. 3 (Step S1). The original cassette feeding apparatus 16 is activated to rotate the insertion rollers 50 and the feed rollers 37 so as to delivery the original cassette 14 to the cassette identifying means 36 through the cassette holding means 34.

When the leading end of the original cassette 14 reaches the cassette identifying means 36, information set in the cassette identifying unit 29 mounted on the leading end of the original cassette 14 is read, so that the original cassette 14 and the type of the original S are identified by the input control circuit 166.

When the information referred to above is read, the original cassette 14 is returned to a predetermined position in the cassette holding means 34. Then, the motor 54 is energized to cause the worm gear 56 and the chain 58 to move the cassette holding means 34 in the direction indicated by the arrow Z. Thereafter, the cassette feeding apparatus 38 is actuated to feed the original cassette 14 to the image reading apparatus 12 through the cassette insertion hole 94.

The identifying mechanism 98 of the image reading apparatus 12 is actuated to identify the original cassette 14. Then, the feed rollers 108 are rotated to feed the original cassette 14 to a position above the turntable 132 in a state in which the original cassette 14 has been held by the guide rollers 106 held in point-to-point contact with the V-shaped grooves 30a, 30b.

After the original cassette 14 has been delivered to the predetermined position on the turntable 132, the auxiliary scanning mechanism 112 is actuated to feed the original cassette 14 together with the original table 110 in the direction indicated by the arrow X, i.e., in the auxiliary scanning direction, thereby causing the image reading unit 150 to read, i.e., pre-scan image information for setting up processing-conditions (Step S2).

More specifically, the illuminating light L emitted from the light source 140 passes through one of the originals S to be read, which are stored in the original cassette 14, followed by travelling to the CCDs 154a through 154c of the photoelectrically converting unit 156 through the focusing lens 152. The CCDs 154a through 154c convert the illuminating light L which has passed through the original S into an electric signal. The electric signal is subjected to a predetermined process in the preprocessing circuit 168 of the control unit 160, and the electric signal thus processed is stored in the image memory 162 as image data and displayed on the CRT display 19 of the console 18.

As will be described later, an operator now sets desired finishing information to the image displayed on the CRT display 19 and designates or specifies, as needed, particular spots as objects to be set. At this time, the image processing condition setting circuit 170 sets up image processing conditions based on the finishing information or the like (Step S3). Incidentally, the image processing conditions includes conditions for setting up, for example, the degrees of highlights and shadows, dot percent, gradation, color correction, sharpness, undercolor removal, etc. with respect to the original film plate.

The original cassette 14, which has been subjected to the pre-scan process (Step S2) and the set-up process (Step S3), is then scanned again based on the image processing conditions so as to read image data. Thereafter, the image processing circuit 172 electrically processes the read image data to produce image data (main-scan image data) used as an output for reproduction (Step S4).

The main-scan image data is then sent to the image output apparatus 20, where it is converted into a light signal such as a laser beam. Thereafter, the light signal thus converted is reproduced on a photographic film as an image (Step S5). The photographic film is sent to the automatic photographic processor 22, where it is developed thereby to obtain a desired original film plate (Step S6).

The production of the original film plate in the present embodiment is roughly carried out in the above-described manner. The setting-up of the image processing conditions in the set-up process (Step S3) will now be described below in detail based on flowcharts shown in FIGS. 7 and 8.

Figure 7:
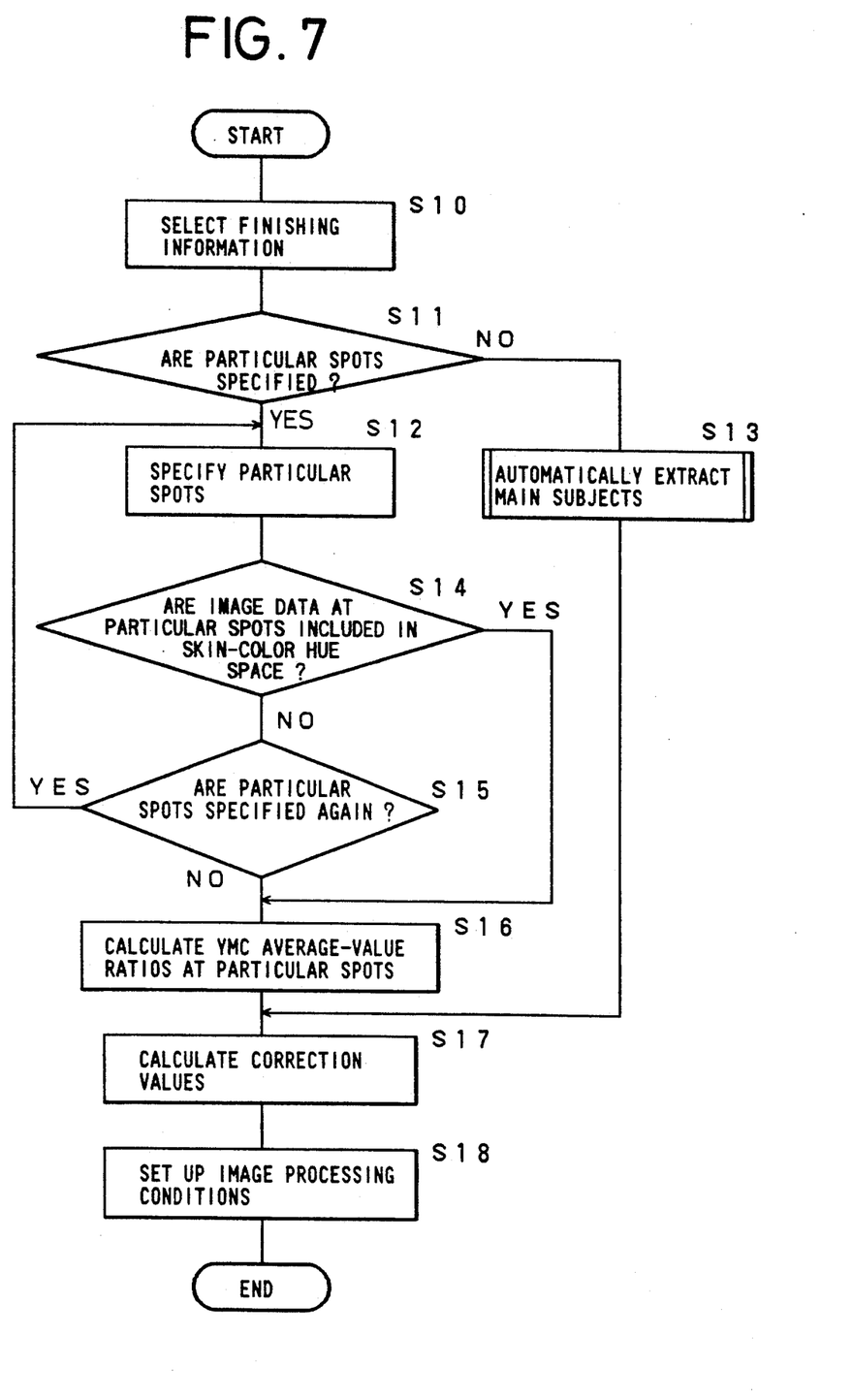
FIG. 7 is a flowchart for describing, in detail, a setting up executed in the flowchart shown in FIG. 6.

A first method of setting up the image processing conditions will first be described in accordance with FIG. 7.

Figure 9:
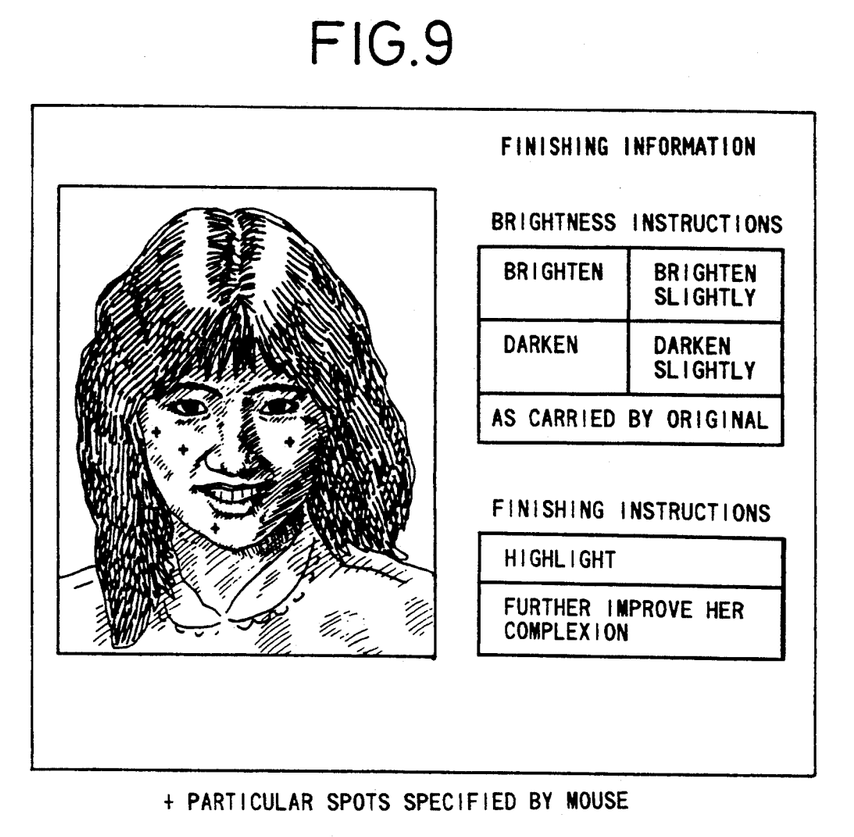
FIG. 9 is a diagram for describing a pre-scan image displayed on the screen of a console shown in FIG. 1.

An image obtained by the pre-scan process in Step S2 is displayed as a pre-scan image on the CRT display 19 together with a menu indicative of desired finishing information as shown in FIG. 9. Now, the finishing information represents information for setting the pre-scan image to desired brightness and finishing, i.e., bringing the same to completion as a final image.

Then, the operator makes use of the mouse 23 to select desired finishing information (Step S10). A description will be made in a case in which a brightness message indicative of "as carried by original" and a finishing message indicative of "further improve her complexion", for example, are selected as finishing information.

After the above finishing information has been selected, the operator specifies spots (or a spot) at which the operator wants to further improve her complexion on the pre-scan image as a plurality of particular spots or places (or a single place) by means of clicks produced by the mouse 23, for example (Step S12). If the particular places are not specified by the operator (Step S11), then main subjects are automatically extracted based on a second method of setting up image processing conditions, which will be described later (Step S13).

Figure 10:
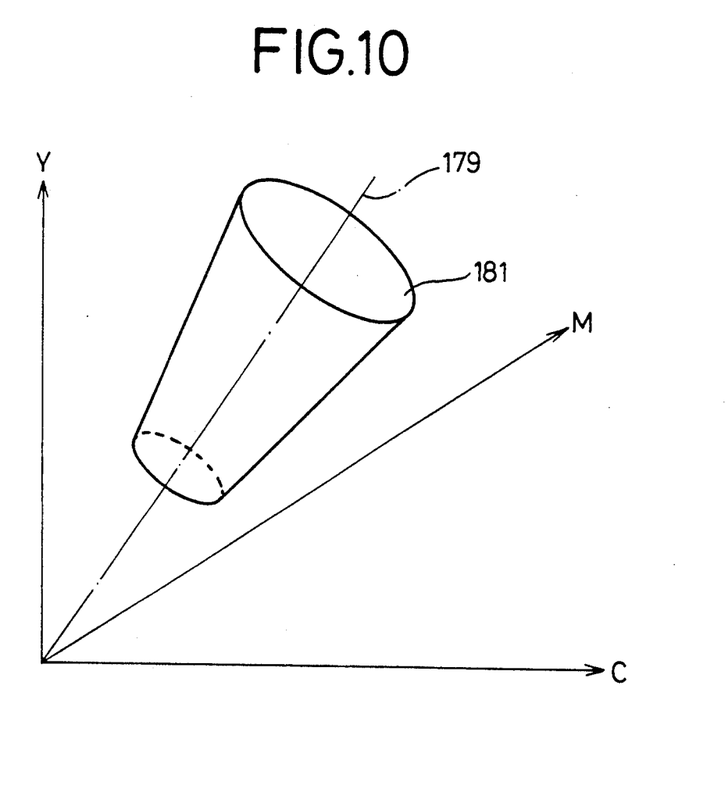
FIG. 10 is a diagram for describing a skin-color hue space set up in a YMC three-dimensional hue space.

The CPU 164 determines (in Step S14) whether or not image data at particular places specified by the mouse 23 are data which exist in a skin-color hue space. More specifically, hue space data set up in advance according to various finishing information statistically determined have been stored in the hue space data memory 163. Thus, a desired skin-color hue space data is selected from the hue space data stored in the hue space data memory 163. As illustrated in FIG. 10 by way of example, the skin-color hue space data is set within a cone-shaped space 181 defined about a standard skin-color axis 179 in a YMC three-dimensional hue space in such a manner as to be directed from an image low-density region to an image high-density region. The setting of the skin-color hue space data within the cone-shaped space 181 defined thereabout can meet various skin colors having different brightness. Since the cone-shaped space 181 can also be represented in simple linear form, the time required to perform arithmetic operations on the image data upon the determination in Step S14, can be reduced.

Figure 11:
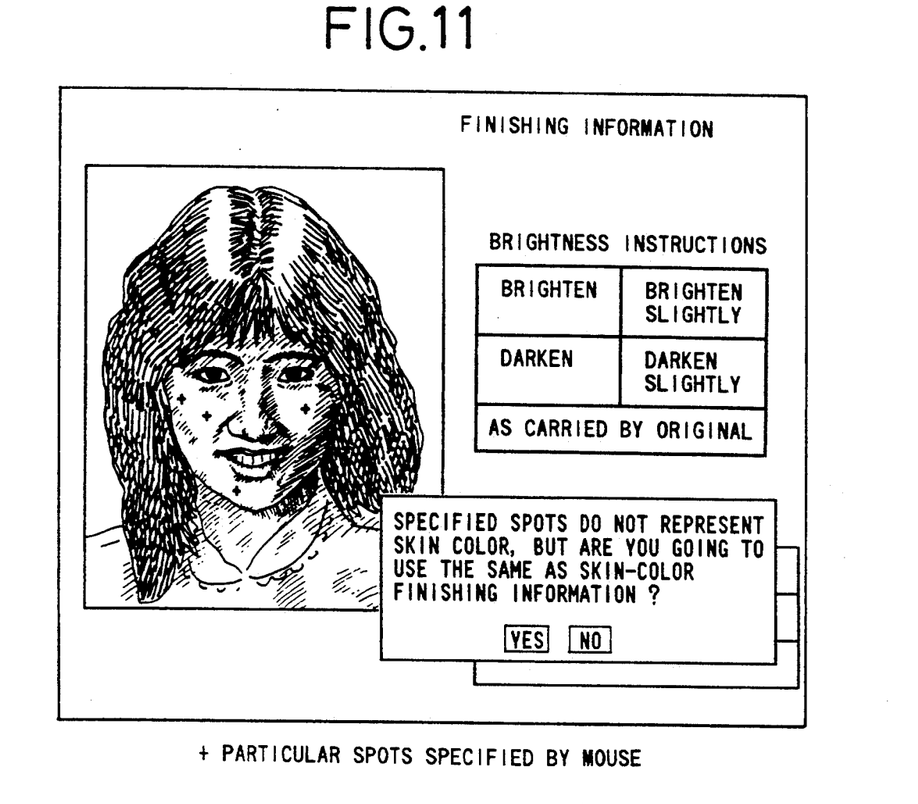
FIG. 11 is a diagram for describing the pre-scan image with messages applied thereto, which has been displayed on the screen of the console shown in FIG. 1.

When the image data at the particular places are not included in the region set up by the skin-color hue space data, the CPU 164 now displays a message indicative of "specified spots (particular places) do not represent the skin color, but are you going to use the same as skin-color finishing information?" on the pre-scan image of FIG. 9 displayed on the CRT display 19, as shown in FIG. 11. At this time, the operator selects "Cancel, i.e., No" if the operator wants to specify the particular places again (Step S15), and repeats the routine procedure from Step S12. If the image data at the particular places are used for the correction of the image processing conditions as they are, then the operator selects "Yes". When the image data at the particular places exist in the region set up by the skin-color hue space data, the character representation shown in FIG. 11 is not performed.

Then, when the particular places are determined, the CPU 164 calculates YMC average-value ratios (y, m, c) with respect to the image data at the particular places (Step S16). Thereafter, the differences between YMC optimum ratios ($y_O$, $m_O$, $c_O$) taken over the preset skin-color data and the ratios (y, m, o) are substituted situated for desired functions $f_y$, $f_m$, $f_c$ respectively so as to calculate correction values $h_y$, $h_m$, $h_c$ as follows (Step S17):

$$h_y = a_y \cdot f_y (Y_O - Y)$$

$$h_m = a_m \cdot f_m (m_O - m)$$

$$h_c = a_c \cdot f_c (c_O - c)$$

where $y_O$, $m_O$ and $c_O$ represent skin colors, exposure conditions, etc., but they may take other components as needed. In addition, $a_y$, $a_m$, $a_c$ respectively represent parameters and can be changed for every correction conditions.

Finally, the image processing condition setting circuit 170 sets up image processing conditions based on the correction values $h_y$, $h_m$, $h_c$ (Step S18).

When the image processing conditions have been set up in this way, e.g., when the image data at the particular places do not represent the skin color, the message shown in FIG. 11 is displayed on the CRT display 19. Therefore, even if the particular places are regarded as small or unwanted errors occur in setting up of the image processing conditions, the operator can recognize such undesired state beforehand. Thus, the operator can accurately set up image processing conditions at all times by specifying the particular places again in accordance with the message. In addition, the operator can select the particular places as requested, thereby causing no problem that colors indicative of, for example, a wall, a sandy beach, etc., which are analogous or similar to the skin color, are processed as the skin color.

Figure 8:
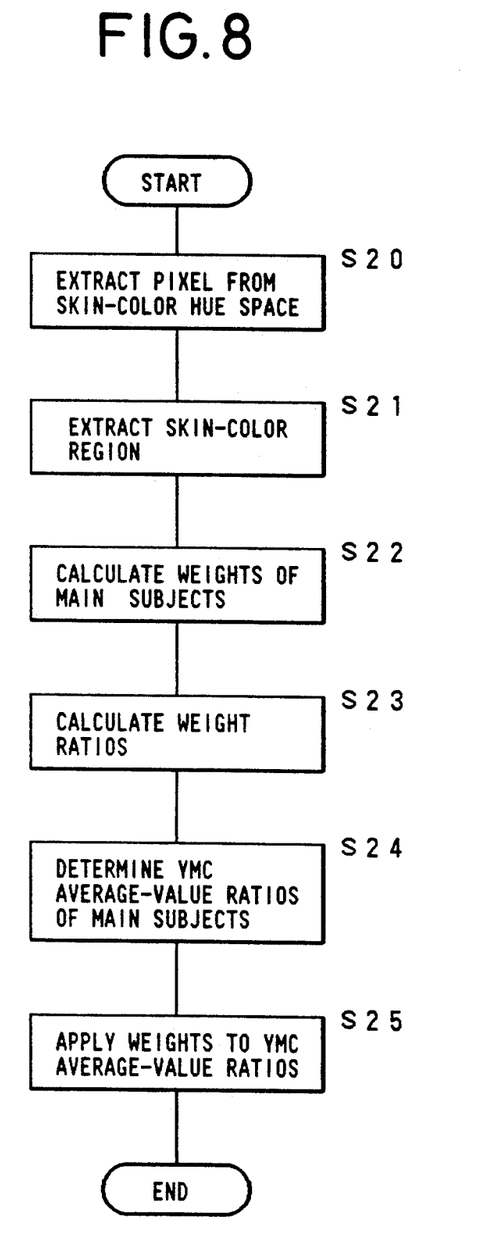
FIG. 8 is a flowchart for describing, in detail, a process of automatically extracting main subjects, which is executed in the flowchart shown in FIG. 7.

The second method of setting up the image processing conditions will now be described below with reference to FIG. 8.

When particular places are not specified (Step S11) after the message indicative of "further improve her complexion", for example, has been selected as the finishing information in Step S10, the CPU 164 automatically extracts desired main subjects from the pre-scan image (Step S13).

Figure 12:
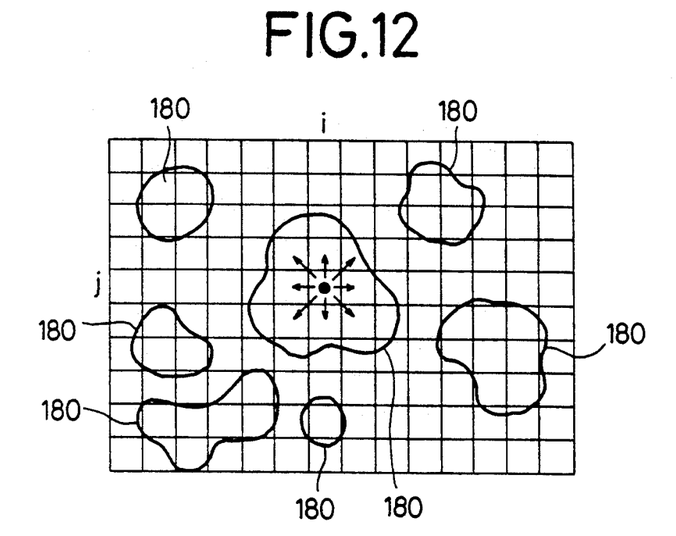
FIG. 12 is a diagram for describing automatically-extracted skin-color regions.

That is to say, the CPU 164 extracts pixel data in the region set up by the skin-color hue space data shown in FIG. 10 from the pre-scan image data stored in the image memory 162 (Step S20). Then, regions at which the pixel data are continuously distributed, are extracted as skin-color regions 180 as illustrated in FIG. 12. Further, three large skin-color regions 180 are successively selected from the skin-color regions 180 referred to above (Step S13) so as to be determined as main subjects $R_1$, $R_2$, $R_3$ (Step S21). When the main subjects $R_1$, $R_2$, $R_3$ are selected, the skin-color regions 180 are set on condition that 8 pixels about (i, j)th image data are regarded as being the same region as shown in FIG. 12, thereby determining the main subjects $R_1$, $R_2$, $R_3$. Thus, the skin-color region 180 defined in the form of one pixel level is no longer set up.

Figure 13:
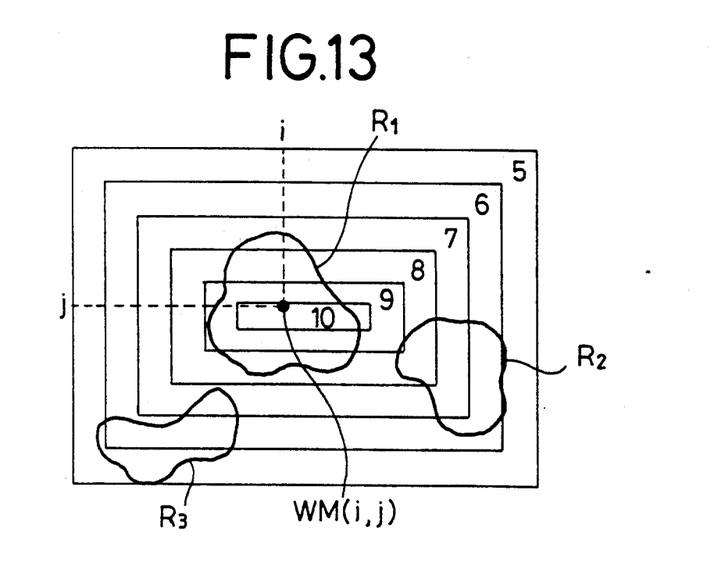
FIG. 13 is a diagram for describing the relationship between the main subjects and a weight map.

Then, weights $W_1$, $W_2$, $W_3$ of the main subjects $R_1$, $R_2$, $R_3$ are respectively calculated based on the following equations using respective weights WM (i, j) (WM(i, j) represents the weight with respect to a (i, j)th pixel) in a weight map set as shown in FIG. 13 (Step S22). Incidentally, the central weight in the weight map is greater than the peripheral weights because one of the main subjects is normally located in the center of the weight map.

$$W_1 = \Sigma_{R1} \text{WM}(i, j)$$

$$W_2 = \Sigma_{R2} \text{WM}(i, j)$$

$$W_3 = \Sigma_{R3} \text{WM}(i, j)$$

where $\Sigma_{R1}$, $\Sigma_{R2}$, $\Sigma_{R3}$ respectively represent operation symbols indicative of addition of the weights WM (i, j) with respect to the main subjects $R_1$, $R_2$, $R_3$.

Then, the weight ratios ($WR_1$, $WR_2$, $WR_3$) are determined from the weights $W_1$, $W_2$, $W_3$ calculated in the above-described manner (Step S23). On the other hand, the YMC average-value ratios ($y_k$, $m_k$, $c_k$) (k = 1, 2, 3) are determined from image data indicative of the main subjects $R_1$, $R_2$, $R_3$ (Step S24). In addition, the YMC average-value ratios thus determined are weighted by the weight ratios ($WR_1$, $WR_2$, $WR_3$) so as to determine new YMC average-value ratios (y, m, c) as follows (Step S25):

$$y = \Sigma y_k \cdot WR_k$$

$$m = \Sigma m_k \cdot WR_k$$

$$c = \Sigma c_k \cdot WR_k$$

In Steps S17 and S18 of the first image processing conditions setting method, the YMC average-value ratios referred to above are then used to calculate correction values and set up the image processing conditions based on the correction values thus calculated.

It is unnecessary to set up the particular places when the image processing conditions have been set up in this way. Therefore, a burden on the operator can be lightened.

According to the image processing method and the image processing apparatus of the present invention, as has been described above, when particular places are not suited to finishing information at the time that the particular places at which image processing conditions are set up, are specified, a message indicative of the unsuitability is displayed, so that suitable particular places can be set again in accordance with its display. Therefore, a failure to specify the particular places, for example, can be avoided beforehand, so that the most suitable image processing conditions can be set up.

Further, according to the present invention, particular places recognized as optimum are automatically set up to enable the setting up of the image processing conditions. At this time, the operator is released from setting up the particular places, thereby making it possible to improve the efficiency of the work.

Furthermore, according to the present invention, the operator can freely make a judgment as to whether or not the particular places should be specified. Thus, for example, when a reproduced image obtained in accordance with image processing conditions automatically set up based on finishing information is deteriorated, particular places are specified to correct the image, thereby enabling the formation of a desired reproduced image. As a result, the degree of freedom of the operator can greatly be improved.

Having now fully described the invention, it will be apparent to those skilled in the art that many changes and modifications can be made without departing from the spirit or scope of the invention as set forth herein.

What is claimed is:

1. A method of processing images by setting up image processing conditions based on image data obtained by scanning image information recorded on an original to be read, said method comprising the steps:
   a first step of displaying one of the images based on said image data;
   a second step of setting finishing information to said one image displayed in said first step;
   a third step of determining hue space data in accordance with said finishing information set to said one image in said second step, thereby extracting desired image data from a region set up by said hue space data; and
   a fourth step of determining a hue image region relative to main subjects from given hue image regions set by said image data extracted in said third step and setting up image processing conditions to determine image data in said determined hue image region as the optimum hue value in said hue space data.

2. A method according to claim 1, wherein said main subjects in said fourth step are a plurality of regions each having a larger area among the given hue image regions set by said image data extracted in said third step, and arranged in such a manner that the centrally-positioned subject of said main subjects has weight greater than that of each of the peripheral subjects as viewed in said one image displayed in said first step.

3. A method of processing images by setting up image processing conditions based on image data obtained by scanning image information recorded on an original to be read, said method comprising the steps:
   a first step of displaying one of the images based on said image data;
   a second step of setting finishing information to said one image displayed in said first step and specifying, as particular spots, objective portions to be set up on the basis of said finishing information;
   a third step of determining hue space data said one image in said second step and determining whether or not image data at said particular spots fall within a region set by said hue space data; and
   a fourth step of determining whether or not image processing conditions relative to said particular spots are set up based on the result of said determination in said third step, and setting up image processing conditions to determine the image data at said particular spots as the optimum value if the answer is determined to be positive and specifying particular spots again if the answer is determined to be negative.

4. An apparatus for processing images by setting up image processing conditions based on image data obtained by scanning image information recorded on an original to be read, said apparatus comprising:
   image displaying means for displaying one of the images thereon based on said image data;
   finishing information setting means for setting finishing information to said one image;
   specifying means for specifying, as particular spots, objective portions to be set up on the basis of said finishing information;
   storing means for storing therein hue space data corresponding to said finishing information;
   determining/displaying means for determining whether or not image data at said particular spots fall within a region set by said hue space data and for displaying the result of said determination thereon; and
   image processing condition setting means for setting up image processing conditions based on the optimum hue value in said hue space data;
   whereby it is determined whether or not image processing conditions relative to said particular spots are set up based on the result of said determination, and if the answer is determined to be positive, image processing conditions are set up to determine the image data at said particular spots as said optimum hue value, whereas if the answer is determined to be negative, desired particular spots are specified again.

5. An apparatus for processing images by setting up image processing conditions based on image data obtained by scanning image information recorded on an original to be read, said apparatus comprising:
   finishing information setting means for setting finishing information to one of the images;
   storing means for storing therein hue space data corresponding to said finishing information;
   image data extracting means for extracting desired image data from a region set up by said hue space data; and
   image processing condition setting means activated such that a hue image region relative to at least one main subject is determined from predetermined hue image regions set by said image data extracted by said image data extracting means and for setting up image processing conditions to determine image data in said determined hue image region as the optimum hue value in said hue space data.

6. An apparatus according to claim 4 or 5, wherein said hue space data corresponding to said finishing information are symmetric about a given hue axis of a cone shaped hue space, and are set in a hue space distributed in such a manner as to be directed from an image low-density region to an image high-density region.

7. An apparatus for processing images by setting up image processing conditions based on image data obtained by scanning image information recorded on an original to be read, said apparatus comprising:
   image displaying means for displaying one of the images thereon based on said image data;
   storing means for storing therein hue space data corresponding to said finishing information;

finishing information setting means for setting finishing information to said one image;

specifying means for specifying, as particular spots, objective portions to be set up on the basis of said finishing information;

selecting means for selectively determining whether or not said portions are specified as said particular spots;

first image processing condition setting means for setting up image processing conditions to determine image data at said particular spots as the optimum hue value in said finishing information when the answer is determined to be positive in said selecting means and said particular spots are specified by said specifying means; and second image processing condition setting means for setting up image processing conditions to determine image data in a region set by said hue space data as the optimum hue value in said finishing information when the answer is determined to be negative in said selecting means.

* * * * *